United States Patent [19]
Fairbanks et al.

[11] Patent Number: 5,624,737
[45] Date of Patent: Apr. 29, 1997

[54] METHOD FOR ADHERING MATERIALS HAVING DIFFERING EXPANSION PROPERTIES AND ARTICLES PRODUCED THEREFROM

[75] Inventors: Robert Fairbanks; Merrill Glos, both of Cincinatti, Ohio; Jeremy P. Miller, Lanesboro; Charles Mulcahy, Clarksburg, both of Mass.; Kurt A. Weiss, Stephentown, N.Y.; William F. Whetstone, Cincinatti, Ohio

[73] Assignee: General Electric Company, Pittsfield, Mass.

[21] Appl. No.: 161,835

[22] Filed: Dec. 3, 1993

Related U.S. Application Data

[63] Continuation-in-part of Ser. No. 18,992, Feb. 18, 1993, abandoned.

[51] Int. Cl.[6] .......................... B32B 27/10; B32B 27/14; B32B 27/36
[52] U.S. Cl. .......................... 428/198; 428/481; 428/537.1; 428/537.5; 428/543
[58] Field of Search .......................... 428/198, 537.1, 428/537.5, 481, 543

[56] References Cited

U.S. PATENT DOCUMENTS 3,616,153  10/1971  Downs .......................... 161/113
5,198,278   3/1993  Sumimoto et al. .......................... 428/95

OTHER PUBLICATIONS

Section 4, Application, Fabrication, and Installation from Decorative Laminates Article.

Recommended Application, Fabrication & Assembly, Technical Data, etc. from Formica Colorcore Brochure.

Fabricating with Colorcore Brand Surfacing Material from Formica Laminating Manual.

*Primary Examiner*—D. S. Nakarani

[57] ABSTRACT

The present invention relates to a novel composite adhesive used to adhere coating materials onto a substrate wherein the substrate material and the coating material have significantly different expansion properties, e.g., thermoplastic coating materials onto cellulose based substrate materials. The composite adhesive comprises both a rigid adhesive such as an epoxy or acrylic and a laminating adhesive such as a rubber based contact cement. In a preferred embodiment of the invention, a spline material is also rigidly adhered to the coating material so as to reinforce the bond between substrate and coating, especially where two pieces of coating material are attached at a seam. In another preferred embodiment the composite adhesive and/or spline material is used in preparing composite articles such as counters, sinks, furniture, profile edging, chemical resistant lab tops, showers, etc.

13 Claims, 3 Drawing Sheets

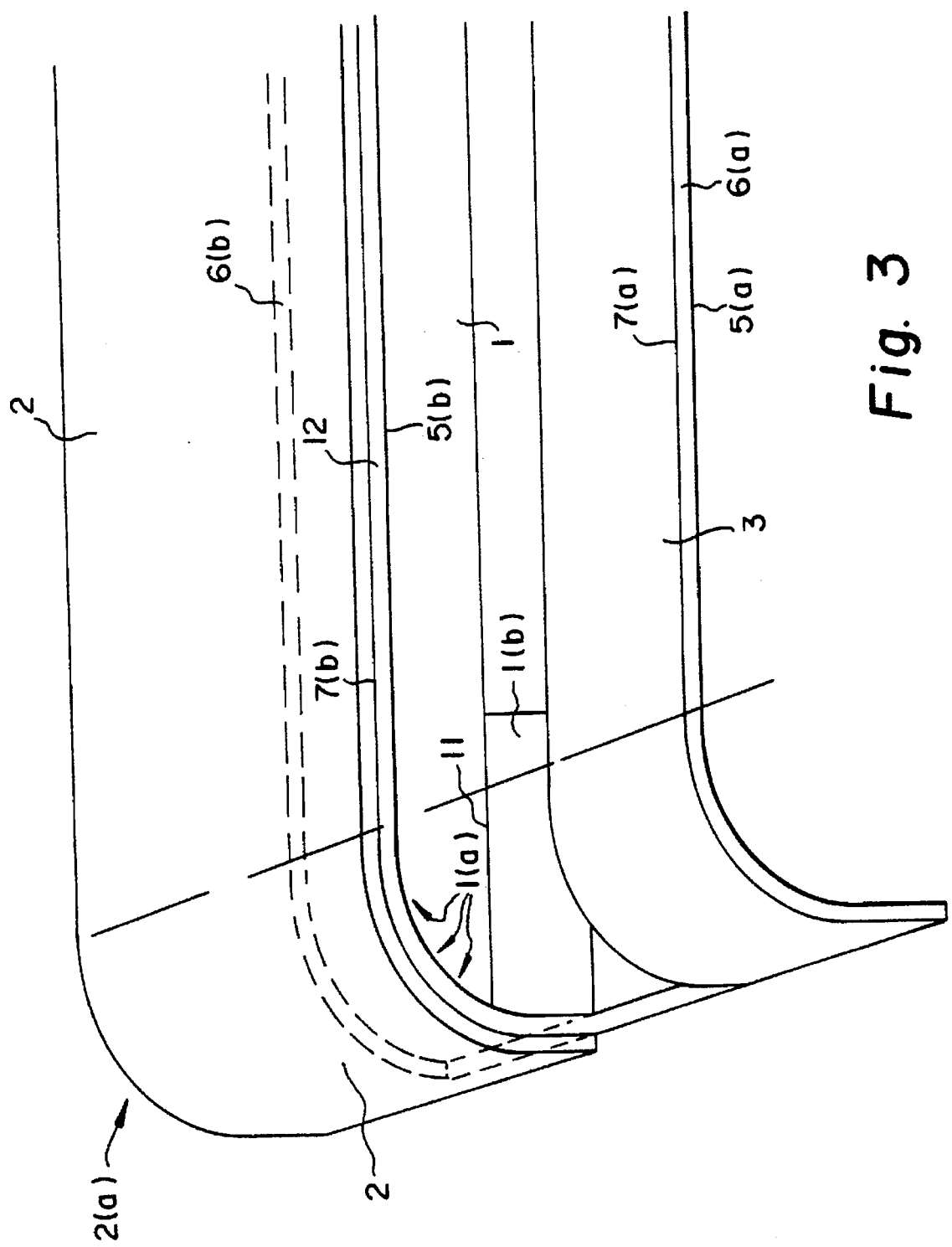

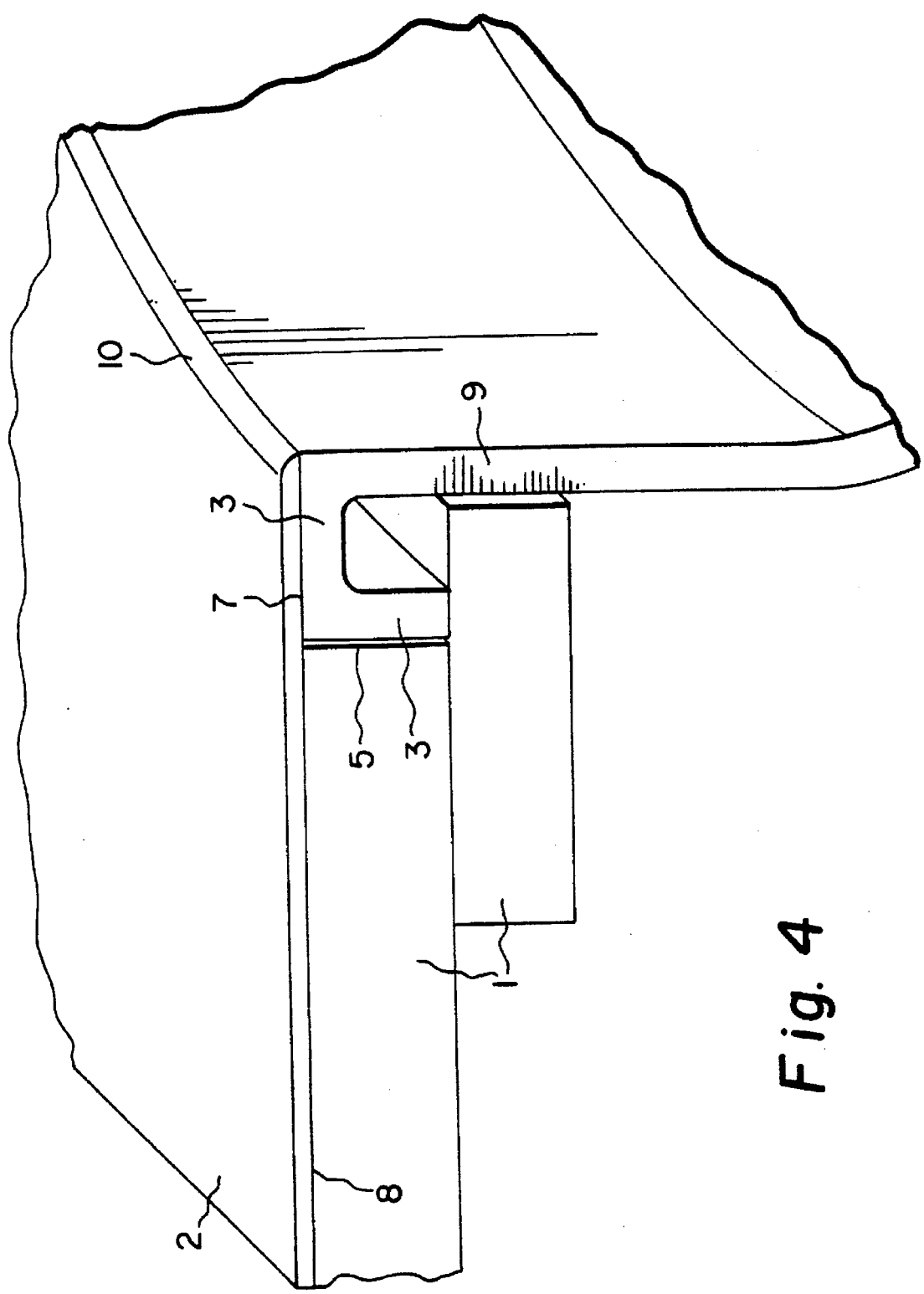

METHOD FOR ADHERING MATERIALS HAVING DIFFERING EXPANSION PROPERTIES AND ARTICLES PRODUCED THEREFROM

This application is a continuation-in-part application of U.S. Ser. No. 08/018,992, filed Feb. 18, 1993, now abandoned.

FIELD OF THE INVENTION

The present invention is directed to a method for adhering materials that have significantly different expansion properties as well as the articles produced therefrom. In particular, the present invention employs the use of a composite adhesive comprised of a rigid adhesive and a laminating adhesive which are used separately, i.e., not blended, to bond a coating material to a substrate material which has significantly different expansion properties. The present invention also contemplates the use of an intermediate material such as a spline material which preferably has expansion properties similar to the coating material to achieve an enhanced bond between the coating and substrate materials.

The present invention also relates to composite articles of manufacture such as counters, furniture, cabinets, work surfaces, profile edging, etc., which are made by the present process.

BACKGROUND OF THE INVENTION

Laminate materials come in various types and have a wide variety of end uses. One area of laminate materials that has been very active is high-pressure decorative laminates or HPDLs. High pressure decorative laminates are used in such applications as countertops (hereinafter referred to as counters), desk tops, cabinets, wall paneling, furniture, etc. There are about seven different types of HPDLs; namely, general-purpose, post-forming, cabinet-liner, backer, specific-purpose, high-wear, and fire-rated. Each of these types of laminate materials are usually constructed out of a coating material such as a laminate, a substrate and some type of adhesive.

In the past, one of the most popular types of laminate materials has been paper based laminates such as Formica®. Typically, the substrate material for a Formica®-type product is also a wood based material such as particleboard. However, Formica® has a number of problems in that it is very brittle, susceptible to stress cracking, difficult to process, and difficult to repair. Consequently, Formica® is relatively limited in its application.

Thus, it would be desirable to use different types of coating materials which do not suffer from the drawbacks of paper based laminates such as Formica®, and which allow for a wider variety of end-use applications. For example, it would be highly desirable to employ a thermoplastic material such as a polyester or even a thermosetting resin, depending on the particular application desired. By the same token, it would also be desirable to vary the substrate materials depending on the end-use application and the desired cost.

However, the present inventors discovered that one of the most difficult problems associated with employing polymer based coating materials with different types of substrates, e.g., cellulose based substrates or the like, is that the two materials usually have very different expansion properties. For example, the coefficient of thermal expansion between, e.g., a highly filled polyester resin and, e.g., particleboard, can be an order of magnitude or more different from one another. Because the different layers expand at substantially different rates and to significantly different degrees, the coating material and the substrate are particularly susceptible to separation one from another.

This problem is unique as compared to Formica®, because Formica® and the wood based substrate to which it is adhered tend to have very similar expansion properties, i.e., expansion properties which are typically less than about 100%. Even then, the prior art teaches that such differences in expansion can and should be minimized by aligning the grains of the substrate and coating materials so that they are as closely aligned as possible. In this manner they will expand and contract along the same lines and to the same degree.

Accordingly, it is an object of the present invention to effectively adhere together a substrate and a coating material having significantly different expansion properties using a composite adhesive and a spline material which has expansion properties similar to the coating material.

It is also an object of the present invention to provide a composite article of manufacture with a substrate and a coating material adhered to one another using a spline material either between the coating and substrate materials or at a joint, bend or other inherently weak bond location in the coating material in such a manner that the coating and substrate materials do not separate even when expanding at significantly different rates.

SUMMARY OF THE INVENTION

The present invention provides a composite article of manufacture comprising a substrate material, a coating material, a spline material which is bound to said coating material, and a composite adhesive which binds together the coating and substrate material. The substrate and coating material are such that they have significantly different expansion properties and the spline material preferably has chemical properties which are similar to the coating material.

The composite adhesive comprises a suitable rigid adhesive and a suitable laminating adhesive which are used in combination. The rigid adhesive is designed to rigidly adhere portions of the coating material to corresponding portions of the substrate material and spline material whereas the laminating adhesive is designed to allow the remaining portions of the coating and substrate to loosely adhere to one another.

The present invention also provides a method for adhering a substrate and a coating material having significantly different expansion properties. The method comprises applying a rigid adhesive and a laminating adhesive to the substrate, the coating, or both. Next, a rigid adhesive is applied to the spline material and/or the coating material and the two are then adhered to one another. Finally, the substrate and coating are attached to one another by means of the composite adhesive materials.

In a particularly preferred embodiment of the present invention, the substrate comprises a cellulose based material such as particleboard, fiberboard or plywood, and the coating material comprises a thermoplastic material such as polyester, polyolefin, polycarbonate, polyetherimide, polyamide, or the like.

In a particularly preferred application such as the fabrication of counters, the rigid adhesive is preferably applied as a thin strip around the exterior portion of the substrate, coating, or both, the laminating adhesive is applied over the remainder of the substrate and/or coating, and the spline material is attached to the coating material wherever the coating and substrates are most likely to separate, i.e., at the joints between two sheets of coating material.

DETAILED DESCRIPTION OF THE INVENTION

Figure 1:
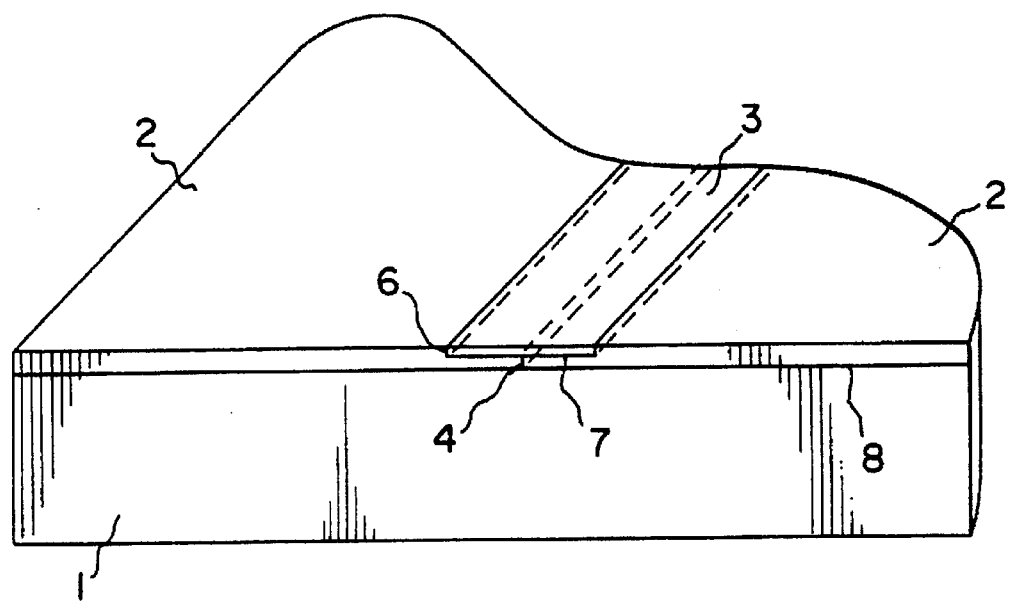

Composite articles of manufacture such as laminate materials and the like are typically constructed with a base substrate and a coating material. When the coating material is a paper based laminate such as Formica® and the substrate is also a wood based material, it is usually possible to adhere the substrate and laminate with a simple contact adhesive. This is possible because the substrate and laminate are formed from similar materials and thus tend to expand and contract at similar rates and to similar degrees. However, the more the substrate and coating materials differ in their expansion properties the more difficult it becomes to maintain suitable adherence between them.

Accordingly, as one aspect of the present invention resides in the use of substrate and coating materials that vary significantly in their expansion properties, the present invention employs the use of a composite adhesive material which is comprised of both a rigid adhesive and a laminating adhesive. It is important to note that by the term "composite adhesive" it is not meant that two or more adhesives are physically combined into a single formulation. Rather, it is intended to imply that two separate adhesives are used in the overall article of manufacture, albeit in different locations. For example, the rigid adhesive may be placed around the perimeter and the laminating adhesive applied to the interior or the rigid adhesive may be placed in horizontal or vertical strips with the laminating adhesive occupying the spaces between the strips of rigid adhesive.

Rigid adhesives are well known and well understood by those skilled in the art. The present invention contemplates the use of any suitable rigid adhesive. The term "suitable rigid adhesive" is intended to include any rigid adhesive which is adhesively compatible with the selected substrate and coating materials and which has sufficient adhesive strength to retain the bond between the coating and the substrate when the two material have significantly different expansion properties. For example, supposing that the coating comprises a thermoplastic blend of polyalkylene terephthalate and polycarbonate and supposing that the substrate comprises a cellulose based material such as particleboard or fiberboard, a suitable rigid adhesive could be fashioned from a solid surfacing adhesive material such as an acrylic or epoxy adhesive.

Depending upon the nature of the substrate and coating materials, there are a number of rigid adhesives that are particularly preferred according to the present invention. As indicated above, it is preferred to use a solid surfacing adhesive material with the substrates and coatings of the present invention, especially when the coatings are thermoplastic in nature. Additionally, it is even more preferred to employ the following solid surfacing rigid adhesives; acrylic adhesives, epoxy based adhesives, urethane adhesives, cyanoacrylate adhesives, and mixtures thereof. There are a number of other solid surfacing rigid adhesives that are preferred when the coating material is other than a thermoplastic or thermosetting resin. For example, it is possible to employ cellulose-compatible rigid adhesives such as vinyl acetate when the substrate and coating materials are cellulose based materials.

The amount of the rigid adhesive used in the composite adhesive is not critical. Thus, it is possible to use very high percentages of rigid adhesive in the overall composite adhesive. However, due to the higher cost of the rigid adhesive, it is preferred from a commercial standpoint to employ as little rigid adhesive as possible and still achieve sufficient adhesion between the substrate and coating materials. In this regard, it is possible to employ very low levels of rigid adhesive. In fact, the amount of rigid adhesive as a percentage of the overall composite adhesive need only be sufficient to withstand the pulling forces associated with the differing expansion properties between the substrate and the coating materials.

For example, it is preferred that the amount of rigid adhesive be no greater than about 75% by weight of the composite adhesive. It is more preferred that the amount of rigid adhesive be no greater than about 25% by weight of the composite adhesive. It is even more preferred that the amount of rigid adhesive be no greater than about 5% by weight of the composite adhesive.

The precise location of the rigid adhesive is also not critical. However, it is preferred to employ the rigid adhesive in those locations where the forces pulling apart the substrate and coating are the greatest, e.g., the perimeter of each piece of coating material, the edges or joints where two pieces of coating material meet, etc.

The second component in the composite adhesive is a laminating adhesive material. Laminating adhesives are also well known and well understood by those skilled in the art. Thus, the present invention contemplates the use of virtually any suitable laminating adhesive. The term "suitable laminating adhesivey" is intended to include any solvent or non-solvent based laminating adhesive that has an adhesive strength sufficient to cause substrate failure, i.e., there is substrate failure, not adhesive failure, when two similar substrate materials which have been adhered together are separated. Additionally, it is also preferred that the suitable laminating adhesive be adhesively compatible with the substrate and coating materials.

The laminating adhesive performs a different function from the rigid adhesive. In particular, where the rigid adhesive is designed to firmly adhere the coating to the substrate even when they undergo expansion or contraction at different rates, the laminating adhesive is designed to permit the coating to "float", i.e., the laminating adhesive should provide some give between the coating and the substrate. Although this "give" is most descriptive of elastomeric laminating adhesives it will be understood that a sufficient amount of "give" or "float" can be provided by a semi-rigid laminating adhesive. However, due to cost and compatibility factors, the elastomeric laminating adhesives are preferred. Thus, the laminating adhesive is more flexible or elastic than the rigid adhesive.

In a preferred embodiment of the present invention, the laminating adhesive comprises at least one of the following: rubber based contact cements, urea-formaldehyde adhesives, resorcinol adhesives, phenol-resorcinol adhesives, casein adhesives, NBR, PVAC or SBR based adhesives.

The amount of the laminating adhesive is not critical. Rather, the laminating adhesive is meant to supplement the rigid adhesive and thus it is used to cover those areas not covered by the laminating adhesive. For example, in one embodiment of the present invention, where the article of manufacture is a counter or the like, it is preferred to employ the rigid adhesive as a thin strip, e.g., approximately one inch in width over an 8 ft by 4 ft surface area, around the perimeter of the substrate material. The laminating material, e.g., contact cement, is then used to cover the remaining portion of the substrate material. Accordingly, the laminating material covers greater than about 90% of the overall surface area to be covered. In other words, the laminating adhesive comprises greater than 90% of the composite adhesive.

The present invention also allows for the use of a wide range of substrate materials, i.e., most of the substrate materials known in the art can be acceptable to the present invention. In a preferred embodiment of the invention, the substrate is comprised of cellulose based materials. Within the range of cellulose based substrates, particleboard, fiberboard and plywood are the more preferred. However, these materials are not critical. Rather, these materials are preferred primarily because of their wide acceptance and availability throughout the industry, as well as their relatively low cost. Thus, given the proper acceptance within the industry, it would be particularly preferable to employ a thermoplastic as the substrate material.

Just as with the substrate materials, one very important advantage of the present invention is the ability to employ a wide variety of coating materials. For example, the present invention is able to accommodate virtually any coating material and almost any substrate provided there exists a suitable rigid adhesive and a suitable laminating adhesive for the combination. This capability exists because the present invention is able to overcome the problems associated with employing coating and substrate materials having significantly different expansion properties.

The term "expansion properties" is intended to include expansion or contraction of the substrate and/or coating material from whatever source. The term "significantly different expansion properties" is intended to imply that the combination of materials have substantially different thermal coefficients of expansion and/or substantially different expansion due to moisture, etc. For example, two cellulose-based products, even with the grains aligned in different directions, are going to have similar thermal coefficients of expansion and they are going to absorb moisture at similar rates and to similar degrees. In contrast, two different materials such as a plastic coating and a cellulose-based substrate have significantly different coefficients of thermal expansion and they absorb moisture to very different levels and rates. For example, depending upon the environmental conditions it is possible to have a plastic coating and a wood substrate moving in opposite directions, e.g., heat has a tendency to expand may thermoplastic materials while it will tend to dry a wood substrate causing it to shrink. The opposite would happen as the moisture level increased and the temperature dropped.

In keeping with the present invention and since the most common-used substrate materials are made of wood, it is preferred that the coating material comprise a non-cellulose based material. The preferred non-cellulose based coating materials are thermoplastic and thermosetting resins, with the thermoplastic resins being the more preferred.

Thermoplastic resin coatings are particularly preferred according to the present invention because of the host of advantages they provide over cellulose based materials. First, modified thermoplastic coatings generally provide significantly better impact resistance. Thermoplastic coatings also provide for easier and more effective repair as compared to cellulose-based products. Additionally, thermoplastics such as a polyester/polycarbonate blend can be glued together with almost no evidence of a seam between the two thermoplastic parts, i.e., they can be adhered to one another at a joint to create a virtually seamless appearance. To the contrary, when using cellulose-based laminates it is easy to detect the joints where two laminates have been adhered together. Another unique advantage of the thermoplastics such as those employed in the countertop applications of the invention is the stain resistance that is provided to the surface of the counter. In particular, the present inventors have found that virtually all stains can be removed from the thermoplastic coating materials with the use of nothing more than a Scotch-brite® pad and ordinary household cleaner. Not surprisingly, thermoplastic coatings are also advantageous in that they can be thermoformed and post-formed.

There are a host of thermoplastic resins which find application in the present invention. For example, the list includes at least the following polymers and/or copolymers and/or blends where appropriate: polyesters, polycarbonates, polyetherimides, polyamides, polyester carbonates, polyphenylene sulfide, polyamideimides, polyarylates, polymethylpentenes, polysulfones, polyethersulfones, polystyrenes, rubber modified high impact polystyrenes, acetals, styrene acrylonitriles, styrene maleic anhydride (SMA), acrylonitrile styrene acrylate (ASA), modified polyphenylene ethers, polyether ketones, acrylonitrile butadiene styrene (ABS), chlorinated polymers such as polyvinyl chloride, fluorinated polymers such as perfluoroalkoxy (PFA), poly(ethylene-chlorotrifluoroethylene) (E-CTFE), poly (ethylenetetrafluoroethylene) (E-TFE), polyvinylidene fluoride (PVDF), fluorinated ethylene-proplyene (FEP), etc., as well as liquid crystal polymers.

As described above, polyester resins are one of the more preferred classes of thermoplastic coatings. In this regard, the preferred polyester resins include polyalkylene terephthalate resins such as polyethylene terephthalate, polypropylene terephthalate, polybutylene terephthalate, polycyclohexyldimethylene terephthalate, as well as mixtures of the above. It is also advantageous to employ a secondary resin such as, e.g., a polycarbonate resin, to further enhance the properties of the polyester resin such as impact, tensile, flow, flame retardance, stability, etc.

The preferred polyesters derived from cyclohexanedimethanol and are prepared by condensing either the cis- or trans- isomer (or a mixture thereof) of, for example, 1,4- cyclohexane dimethanol with a hexacarbocyclic dicarboxylic acid so as to produce a polyester. The preferred polyester resins may be derived from the reaction of a mixture of the cis- and trans-isomers of 1,4-cyclohexanedimethanol with a mixture of iso- and terephthalic acids.

These polyesters can be produced by well known methods in the art such as those set forth in U.S. Pat. No. 2,901,466. The poly(1,4-cyclohexanedimethanol terephthalate) is commercially available, e.g., under the name "KODAR" from Eastman Chemical Products Co.

Of course, it is to be understood that the preferred polyester resins used in this invention can be prepared by condensing 1,4-cyclohexanedimethanol and minor amounts of other bifunctional glycols with the hexacarbocyclic dicarboxylic acid. These other bifunctional glycols include the polymethylene glycols containing from 2 to 10 or more carbon atoms such as ethylene glycol, butylene glycol, etc.

Examples of hexacarbocyclic dicarboxylic acids wherein the carboxy radicals are attached in para relationship to a hexacarbocyclic residue include terephthalic acid, trans-hexahydroterephthalic acid, p,p'-sulfonyldibenzoic acid, 4,4'-diphenic acid, 4,4-benzophenonedicarboxylic acid, 1,2-di(p-carboxyphenyl)ethane, 1,2-di(p-carboxyphenyl)ethane, 1,2-di(p-carboxyphenoxy)ethane, 4,4'-dicarboxydiphenyl ether, etc., and mixtures of these. All of these acids contain at least one hexacarbocyclic 1,5- or 2,6-naphthalenedicarboxylic acid. The hexacarbocyclic dicarboxylic acids are preferably those containing a transcyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid.

The high molecular weight polyesters are polymeric glycol esters of terephthalic acid and isophthalic acids. They are available commercially or can be prepared by known techniques. See, for example, U.S. Pat. Nos. 2,465,319 and 3,047,539.

Thermoplastic elastomeric materials suitable for use as impact modifiers include, but are not limited to, SBR, AB and ABA block copolymers such as "KRATON-D" and "KRATON-G"; styrene-butadiene modified acrylics; acrylic modifiers such as "EXL 2330" from Rohm & Haas Company; core shell acrylics such as "EXL 2691", also from Rohm & Haas; High rubber grafts ABS, EVA and EEA polymers. These and other impact modifiers are described in U.S. Pat. Nos. 4,034,013; 4,096,202 and 4,180,494 and in Modern Plastics Encyclopedia; 1988 Edition, p. 160. Effective amounts are readily determined, e.g., by replacing part of the polyester component and measuring the impact strength of the resultant composition. Effective amounts will generally result in at least doubling the impact strength of the composition as measured in a standard test, for example, the notched Izod impact strength test, which is well known to those skilled in the art. In general, as mentioned above, effective amounts usually will be in the range of from about 1 to about 40 percent by weight based on the total weight of the resinous components.

Most preferred as impact modifiers are the family of engineering thermoplastic elastomers comprising copolyetherester and copolyetherimide ester resins. These include both random and block copolymers. They include also polyester hard block, polyester soft block-modified thermoplastic elastomers. In general these are prepared by conventional esterification/polycondensation processes from (a) one or more diols, (b) one or more dicarboxylic acids, (c) one or more long chain ether glycols, and/or a diamino terminated derivative thereof and, optionally, one or more caprolactones or polycaprolactones. In addition to being commercially available, the copolyether esters are described in U.S. Pat. Nos. 3,023,192; 3,651,014; 3,763109; 3,766,146; 3,784,520; 3,801,547; 4,156,774; 4,264,761; 4,355,155; and 4,706,112.

Suitable commercially-available copolyether esters include LOMOD® resins, all products of GE Plastics; HYTREL® thermoplastic elastomer resins, products of DuPont Company; RITEFLEX® resin, a product of Celanese Company; ARNITEL® resin, a product of AKZO Company; PELPRENE® resin, a product of TOYOBO Company, as well as others.

Suitable copolyetherimide esters for use as impact modifiers in the present invention are prepared by methods described by McCready et al in U.S. Pat. Nos. 4,556,688, 4,556,705 and 4,760,112. Many are also commercially available, such as the LOMOD® resins of GE Plastics.

It is further preferred to employ an inorganic filler to the polyester resin to impart a series of additional beneficial properties, not the least of which are thermal stability, increased density, and texture. Inorganic fillers are well known in the art and virtually any inorganic filler known in the art can be used in the present invention.

Typical inorganic fillers which are employed in thermoplastic resins in general, and polyesters in specific, include: zinc oxide, barium sulfate, zirconium oxide, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins, glass microspheres, wollastonite, titanium dioxide, ground quartz as well as mixtures of the above. A few of the more preferred fillers include zinc oxide, barium sulfate, zirconium oxide, zirconium silicate, strontium sulfate, titanium dioxide, glass microspheres and mixtures of the above.

The molding compositions may include a resin as specified above with from 20–85% by weight, preferably 30–75% by weight or most preferably 30–50% by weight of total composition of filler component. For certain applications where a ceramic like product is desired, more than 50%, or more preferably 60–85% by weight of the total composition of filler component should be employed.

The thermoplastic resin coatings may also include other additives which are well known in the art. For example, the resin coatings may contain external lubricants, antioxidants, flame retardants or the like. If desired, fiberglass and/or other fibrous reinforcing fillers may be added as well as pigments, ultraviolet stabilizers, metal additives for electromagnetic radiation shielding such as nickel coated graphite fibers, anti-static agents, coupling agents such as amino silanes and the like.

The composition of the spline material is not critical as its primary functions are (1) providing a larger bond area for lap shear, (2) distributing the stresses associated with the differing expansion properties between substrate and coating material or the stresses which are focused at the joint of two sheets of coating material, and (3) providing two materials of similar chemical composition for which a suitable adhesive may be selected. Consequently, a wide range of materials can function effectively as a spline material. It is preferred, however, that the spline material have expansion properties and/or chemical properties that are similar to the coating material so that either or both the second and third functions listed above may be performed.

In order to better illustrate the function, properties, and broad application of the inventive concept embodied herein, the following is a description of attached FIGS. 1, 2, 3 and 4.

FIG. 1 demonstrates how the spline material 3 can be used at the interface 4 of two coating materials 2. Typically, the bond between the coating material 2 and the substrate material 1 which is identified as interface 8 will have the greatest tendency to separate at the interface 4 between the two pieces of coating material 2. Thus, by routing or carving out appropriate sections in the coating material it is possible to place in a section of spline material 3 which can be rigidly adhered to the coating material 2 at interfaces 6 and/or 7. The spline material may then be sanded down until it is flush with the coating material and a smooth surface is obtained.

The spline material is not intended as a third complete layer between the entire length and width of the coating and substrate materials. Rather, the spline is meant to overlap only a relatively small length and width of the coating and/or substrate material. The length and width need only be sufficient to enhance the bond between substrate and coating so as to avoid separation thereof.

Figure 2:
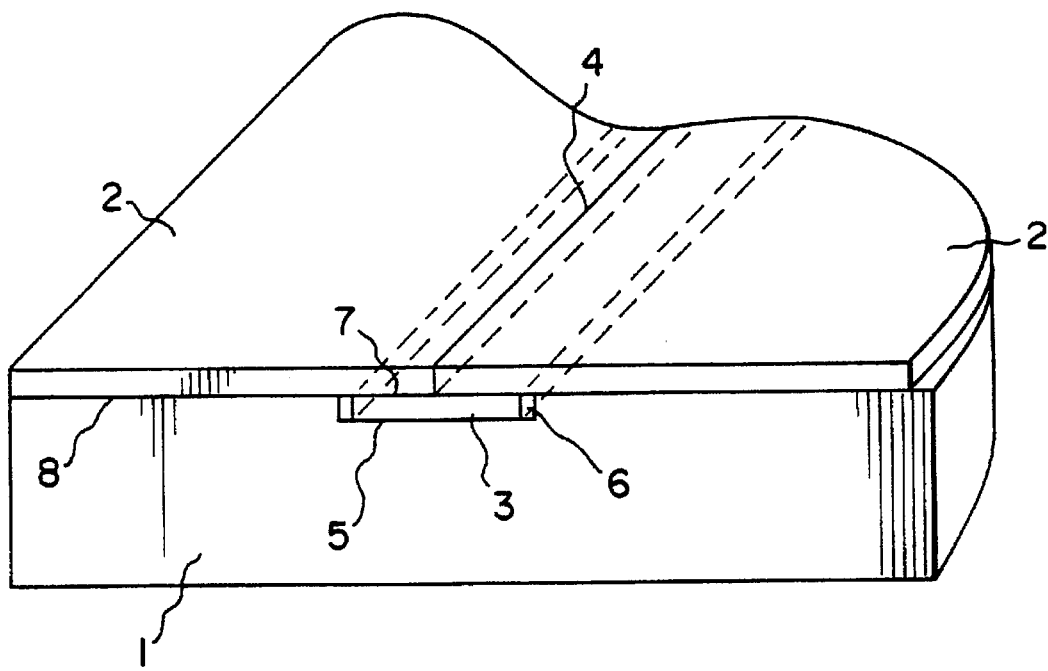

Similarly, as can be seen in FIG. 2, The spline material 3 is again used to enhance the bond between the substrate material 1 and the coating material 2 by increasing the bond area between like materials and distributing the stresses previously concentrated at the interface 4 to the area along interfaces 5, 6 and 7. However, in FIG. 2, the spline material 3 has been placed in a section of substrate material 1 which has been routed or carved out. The spline material 3 is inserted into the groove in the substrate material 1 and a rigid adhesive is applied at interface 7 and a laminating adhesive is applied at interface 5. Either a rigid adhesive, laminating adhesive or no adhesive at all may be used at the interface 6. Again, the use of the spline material 3 is designed to enhance the overall adherence of the coating material 1 to the substrate material 2 along the interface 8.

FIG. 3 demonstrates how the spline material may be used to reinforce the bond between coating 2 and substrate 1 where the coating has been postformed to take on a curved shape 2(a) and where there are two sections of coating 2 and substrate 1 attached to one another (not shown in this figure). The wood substrate has been carved or sanded to take on the rounded edge 1(a). Here again, a groove 12 is routed in the substrate 1 and a spline material 3 is placed in the groove 12 with a rigid adhesive being first applied to the top 7(a) of the spline 3 or to the bottom 7(b) of the coating 2, a laminating adhesive being applied to the bottom 5(a) of the spline 3 or to the top 5(b) of the substrate 1, and either rigid or laminating adhesive or no adhesive being applied to edge 6(a) of the spline 3 or the edge 6(b) of the groove 12. FIG. 3 represents a side view of the front edge of a countertop which has been postformed for aesthetic reasons wherein the spline 3 is shown as being removed from the groove 12. In this figure there is also a second block of substrate 1b which has been attached to the first block of substrate 1 at interface 11. A laminating adhesive is preferred for the interface 11 as the bond is between two cellulose-based materials.

FIG. 4 represents a side view of a counter (1 and 2 combined) with an integrated sink 9. In this preferred embodiment of the invention a portion of the substrate 1 is routed or cut away leaving room for the spline portion 3 of the integrated sink 9 to be adhered with a laminating adhesive to the substrate 1 at interface 5 and to the coating 2 at interface 7 with a rigid adhesive. Optionally, a second piece of material may be attached under the substrate 1 and under the spline 3 to further reinforce the integrated sink 9. In this figure, a second block of substrate 1 is depicted as serving this purpose. However, it is understood that any material could readily serve this function. The edge 10 of the coating material 2 may be sanded or carved so as to provide for a smooth transition from coating material 2 to integrated sink 9. In a particularly preferred embodiment wherein the coating 2 and the integrated sink 9 are made out of the preferred filled polyester/polycarbonate thermoplastic material, this transition can be made to appear virtually seamless. It is worth noting that the article of manufacture according to this invention can be attached to virtually any other article of manufacture, either single or multilayered, shaped or nonshaped, e.g., a single layered article such as Surrel® thermoset polyester sink, counter or the like.

FIG. 4 is also useful in demonstrating that the present invention contemplates that the spline material may, in fact, be comprised of an integrated article which is designed to enhance the original article of manufacture. For example, in FIG. 4, a portion of the sink mount actually functions as the spline material 3 which is attached to the surface of the coating material 2 at interface 7 and which is also attached to the substrate material 1 at interface 5. This spline material actually serves to enhance the bond between the substrate material 1 and the coating material 2 while allowing the manufacturer to attach a second article of manufacture (e.g., an integrated sink 9) to the first article of manufacture (e.g., a counter (1 and 2 combined)).

As mentioned above, this invention is uniquely applicable to an article of manufacture wherein the substrate and coating materials have significantly different expansion properties. For example, using the coefficient of thermal expansion as one measure of expansion properties, the present invention is capable of accommodating differences in coefficient of thermal expansion on the order of at least 300%. That is, the coating material may have a coefficient of thermal expansion which is three (3) times that of the substrate material, or vice versa. It should be noted, however, that this degree of difference is equally applicable for expansion due to sources other than temperature, e.g., moisture, etc. In a preferred embodiment of the invention, the difference in expansion properties between the substrate and coating can be at least 500%. In a more preferred embodiment of the invention, the difference in expansion properties between the substrate and coating can be at least 750%, and most preferably, at least 1000%.

The preferred applications for the coatings and substrates according to the invention include those areas in which laminate materials and wood based substrates have predominated. As explained in the Background section of the invention, these areas include composite articles of manufacture such as counters, integrated sinks, desks, shower surrounds and other bathroom accessories, furniture, doors, appliance fascias, cabinets, work surfaces, profile edging, tile walls and chemical resistant lab tops, with the most preferred application being counters. When the article of manufacture is a counter, for example, it is further preferred that the coating material comprise at least one polyester resin such as a polyalkylene terephthalate which optionally includes a polycarbonate, polyetherimide or other modifying resin.

Another unique advantage of the present invention that was discovered through the work with thermoplastic coated counters is the ability to adhere several counter pieces together at their respective joints without creating any appearance of a joint at that location. This unique advantage has been labeled by the present inventors as "a virtually seamless appearance."

The present invention also contemplates a method of repairing an article of manufacture having a coating material and a substrate material with different expansion properties. According to this aspect of the invention, when a portion of an article of manufacture has become damaged, it is possible to remove the damaged section and replace it with a spline material as described above. By so doing, the surface of the coating material can be restored to have a like-new appearance without any highly visible seam lines where the spline material has been inserted and the bond between the sections of material can be increased.

The present process begins by selecting suitable spline material according to the end-use application. It is important to note that while the present process is suitable for virtually any spline material, it finds the most utility when the spline material is compatible either aesthetically and/or functionally with the coating and substrate materials. After selecting the appropriate spline material, the a groove is cut or routed into the substrate or coating and the spline is inserted into the groove after a suitable adhesive is first placed in the groove or on the spline itself or both. It is preferred that the two different types of adhesive (rigid and laminating) are used over distinct portions of the spline, substrate and/or coating material because they each serve independent functions within the broad realm of adhesion and because they tend to counteract one another if placed in physical contact.

In order to further illustrate the present invention and the advantages thereof, the following specific examples are given, it being understood that the same are intended only as illustrative and in no ways limitative.

EXAMPLE 1

In an effort to demonstrate the effectiveness and utility of the present invention in a specific application such as countertops, an adhesive evaluation was conducted. The bond strength of a thermoplastic coating material, e.g., polyester based thermoplastic material (PBT/PET) modified and with polycarbonate and inorganic filler, to itself and two substrates using various adhesives was conducted as follows. The substrate materials used were ¾" thick particleboard and ¾" medium density fiberboard. The adhesives chosen were as follows:

| | |
|---|---|
| Elmers carpenters wood glue | PVA base |
| Corian joint adhesive | |
| Methylmethacrylate | |
| ITW 2X-78P | |
| Methylmethacrylate | |
| Ciba-Geigy LMH 627-88 | Epoxy |
| 3M 1357 contact cement | Solvent base contact |
| 3M 30NF green | Water base contact |
| Macklanburg-Duncan | Non-flammable con contact |
| Macklanburg-Duncan | Solvent base contact |
| Weldbond | PVA base |
| Hybond 95 | Solvent base contact |

Various combinations of similar and dissimilar coating/ substrate materials were used in conjunction with the above-identified adhesives. The samples were prepared in both lap shear and butt-joint configurations. In the case of the lap joint samples an overlap of approximately 0.5" by 1.0" wide was used. The butt-joint area varied with the thickness of the sample. The wood products were 0.750" thick and the thermoplastic material was 0.125", in all cases the samples were 1.0" wide. All of the samples were assembled in the sample fashion and kept clamped while curing. Testing was done after 24 hours of cure time.

TABLE 1

Bonding Data
Thermoplastic to Thermoplastic
Tensile strength in psi
(standard deviation)

| Adhesive | Butt-weld | Lap-shear |
|---|---|---|
| ITW | 193 | 681 SF |
| | 48 | 97 |
| Corian | 174 | 567 CF |
| | 15 | 67 |
| Ciba-Geigy | 272 | 736 SF |
| | 60 | 22 |

SF = substrate failure  AF = adhesive failure  CF = cohesive failure

TABLE 2

Bonding Data
Particleboard to Particleboard
Tensile strength in psi

| Adhesive | Butt Joint |
|---|---|
| ITW | 143 |
| | 26 |
| Corian | 364 |
| | 37 |
| Weldbond | SF |
| Ciba-Geigy | SF |
| Elmers | SF |

SF = substrate failure  AF = adhesive failure  CF = cohesive failure

TABLE 3

Bond Strength
Fiberboard to Fiberboard
Tensile strength in psi

| Adhesive | Butt Joint |
|---|---|
| ITW | 226 |
| | 46 |
| Corian | 558 |
| | 55 |
| Weldbond | SF |
| Ciba-Geigy | SF |
| Elmers | SF |

SF = substrate failure  AF = adhesive failure  CF = cohesive failure

TABLE 4

Bonding Data
Thermoplastic Material to Particleboard
Tensile Strength in psi

| Adhesive | Lap shear |
|---|---|
| 3M 30NF | 12 |
| | 2.5 |
| 3M 1357 solvent | 100 |
| | 23 |
| MD NF | 47 |
| | 9 |
| MD solvent | 94 |
| | 13 |
| Hybond 95 solvent | 117 |
| | 20 |
| Weldbond | 251 |
| | 15 |
| ITW | 362 |
| | 21 |
| Corian | 369 |
| | 34 |
| Ciba-Geigy | 450 |
| | 36 |

SF = substrate failure  AF = adhesive failure  CF = cohesive failure

TABLE 5

Bond Data
Thermoplastic Material to Fiberboard
Tensile Strenigth in psi

| Adhesive | Lap shear |
|---|---|
| 3M 30NF | 60 |
| | 13 |
| 3M 1357 solvent | 79 |
| | 9 |

TABLE 5-continued

Bond Data
Thermoplastic Material to Fiberboard
Tensile Strenigth in psi

| Adhesive | Lap shear |
| --- | --- |
| MD NF | 79 |
|  | 10 |
| MD solvent | 176 |
|  | 20 |
| Hybond 95 solvent | 248 |
|  | 26 |
| Weldbond | 341 |
|  | 37 |
| ITW | 550 |
|  | 45 |
| Corian | 577 |
|  | 25 |
| Ciba-Geigy | 806 |
|  | 31 |

SF = substrate failure  AF = adhesive failure  CF = cohesive failure

Discussion of Results:

I. Thermoplastic to Thermoplastic

Both the ITW and Ciba-Geigy products give high lap shear and butt-weld strengths. These products performed better than the Corian adhesive that they were compared against. The lap shear samples were of sufficient strength to cause substrate failure.

II. Particleboard to Particleboard/Fiberboard to Fiberboard

All products performed well the Ciba-Geigy adhesive generated substrate failure along with the more common wood adhesives. When comparing the wood products, the bonds to the fiberboard appeared to be stronger.

III. Thermoplastic to Particleboard/Fiberboard

The solvent based contact cements are stronger than their water based or non-flammable counterparts. Strengths are also typically higher when bonding to fiberboard. The structural adhesives showed much higher strengths when compared to the contact cements, and also higher values when bonded to fiberboard.

EXAMPLE 2

Samples of the thermoplastic material of Example 1 were prepared using Elmers white glue to determine its effectiveness as a bonding agent for use in countertops. Standard lap shear specimens were prepared bonding the thermoplastic material to itself, medium density fiberboard and particleboard. The results were as follows:

Table 6

Bond Data

I. Thermoplastic to Thermoplastic
60 psi

All adhesives failures

II. Thermoplastic to Particleboard
67 psi

Adhesive failure to thermoplastic

III. Thermoplastic to Fiberboard
105 psi

Adhesive failure to thermoplastic

None of the above combinations gave positive results. In all cases the glue did not adhere very well to the thermoplastic material. Elmers glue is based on polyvinyl acetate and has been traditionally used on porous substrates like wood and paper. PVA based products also have poor water resistance properties which could be a consideration in this application. In comparison to an earlier evaluation with various contact cements this product has higher shear strength but has poor adhesive quality to the thermoplastic.

EXAMPLE 3

The following additional data was collected in order to demonstrate the utility and advantages of the preferred counter (countertop) application. Four countertops were prepared using a 1/8" thermoplastic resin coating (at lease one polyalkylene terephthalate, polycarbonate and a filler) and a 3/4" medium density particleboard substrate. All four countertops used rigid adhesive at the seams and joints. Two of the counters had rigid adhesive between the particleboard and the thermoplastic resin coating in a one inch width around the entire perimeter and underneath the seams. All samples had the same thermoplastic edges put on and routered to a flat surface before the coating was installed.

TABLE 7

| | Counter Samples | | |
| --- | --- | --- | --- |
| Sample No. & Dimensions | Contact Adhesive | Rigid Adhesive | Perimeter |
| 1<br>7' × 25" rectangle | Hybond (solvent) | Ciba Geigy Epoxy | none |
| 2<br>7' × 25" rectangle | Hybond (solvent) | Ciba Geigy Epoxy | one inch |
| 3<br>7' × 25" rectangle | Hybond (solvent) | ITW Acrylic | none |
| 4<br>7' × 25" rectangle | Hybond (solvent) | ITW Acrylic | one inch |
| 5<br>7½' × 6' "L" (w/kitchen sink) | Hybond (solvent) | Ciba Geigy Epoxy | one inch |

Environment:

Small scale testing showed failures at −40° F. with all samples, so low temperatures were limited to −20° F. Similar failures were seen at 140° F., so high temperatures were limited to 120° F. High humidity at temperatures below freezing creates snow and frost, and impedes performance of the Thermotron®, so high humidity soaks were done at room temperature for 24 hours before bringing temperature down to extremes. Accordingly, the Thermotron® settings were as follows: (1) 24 hours at 95% humidity, (2) 24 hours at −20° F., and (3) 24 hours at 120° F. and minimal humidity (less than about 10%).

TABLE 8

| | Counter Sample Bond Data | |
| --- | --- | --- |
| Sample No. | Effect | Comments |
| 1 | Failure | Seams separated at low temperatures. Edges fell off at high temperatures. |
| 2 | No Effect | Some blistering (between |

TABLE 8-continued

Counter Sample Bond Data

| Sample No. | Effect | Comments |
| --- | --- | --- |
|  |  | thermoplastic resin coating and particle board) at high temp., but when temp. was brought down to room temp., blisters disappeared. |
| 3 | Failure | Seams separated at low temperatures. Edges fell of at high temperatures. |
| 4 | No Effect | Some blistering (between thermoplastic resin coating and particle board) at high temp., but when temp. was brought down to room temp., blisters disappeared. |
| 5 | No Effect | Very slight blistering. No problems with sharp corner. Kitchen sink bolted to long direction minimized distortion and blisters. |

From the above, it can be seen that the composite adhesive system according to the present invention is remarkably effective in preventing separation of the coating material from a substrate, even when the coating and substrate have significantly different expansion properties. In this regard, a relatively small amount of the rigid adhesive, either the acrylic or the epoxy, limited expansion and contraction of the counter composite. The one inch border of rigid adhesive also kept the edges from popping off and kept the seams together so that the virtually seamless appearance was maintained. Although blistering was a concern at very high temperature, the laminating adhesive successfully expanded with the materials and then pulled the top back to the substrate at room temperature.

EXAMPLE 4

The following example was conducted to demonstrate yet additional advantages of the present invention. Accordingly, several samples were constructed to simulate sheet, square edge, and postformed countertops in shipping. In Example 3, rigid adhesive was placed under the thermoplastic sheet in a one inch border, at the seams, and around the edges to limit expansion and contraction. Since this was impractical in a postforming operation, alternative methods were employed. The postformed edges took care of themselves. With the sheet being bent around 90 degree corners, the expansion and contraction in the depth dimension was somewhat limited by the off plane sheet (and adhesive). The worst growth was at the ends of the sheet or at the seams. In order to simulate the worst case, a seam was placed in the center of a simple countertop using rigid adhesive to produce an inconspicuous seam and hold the particleboard together. The edges were held fixed by having a one inch border of rigid adhesive around the perimeter of the top. This forced all expansion and contraction to try and occur at the seam. Besides the adhesive used to butt joint the two halves together, no rigid adhesive was used around the seams.

Sample preparation:
I. Two simple square edge countertops:
Substrate—medium density particleboard.
Dimensions—7 ft×25 in. rectangle.
Tops shared a one inch border of ITW rigid adhesive around the outside, and Hybond contact adhesive in the center.

Seams were as follows:
The tops had a seam in center of the lengthwise direction. The tops had a wood scab under particle board seam.
One top had ITW rigid adhesive for seams without a one inch border surrounding seam.
One top had a 25"×1" spline placed at the seam between the particle board and the thermoplastic resin coating to limit expansion and contraction of the seam.

II. Two simple postform top simulations:
Substrate—medium density particleboard.
Dimensions—7 ft×25 in. rectangle.
The tops had no rigid adhesive around the outside edge.
Seams—none.
one top used Hybond contact adhesive.
One top used Morton Adhesives' one part water based urethane contact adhesive.

III. Postformed top:
Substrate—medium density particleboard.
Dimensions—7 ft×25 in. rectangle.
Seams—none.
Adhesive—Hybond contact adhesive Environmental Chamber Conditions: The Thermotron® test chamber has the ability to change both temperature and humidity. Particleboard sees wide swings in expansion and contraction with changes in humidity. Coefficient of thermal expansion for particle board is very close to that of wood, and is an order of magnitude less than the thermoplastic resin coating. Therefore, the worse case scenario would involve a countertop acclimated to dry Arizona, and then shipped to the cold humid Northeast. The Thermotron was set up to mimic these conditions in varying levels of severity.

TABLE 9

| | Environmental conditions | | |
| --- | --- | --- | --- |
| Cycle | Time (hours) | Temperature (°F.) | Humidity (%) |
| 1 | 8 | 32 | 20 |
| 2 | 6 | 100 | 0 |
| 3 | 3 | 100 | 95 |
| 4 | 8 | 0 | 20 |
| 5 | 6 | 120 | 0 |
| 6 | 3 | 120 | 95 |
| 7 | 8 | −20 | 20 |
| 8 | 6 | 140 | 0 |
| 9 | 3 | 140 | 95 |
| 10 | 8 | −40 | 20 |
| 11 | 8 | 75 | 95 |

Results:
I. Square Edge Countertops:
The results of these examples are summarized in Tables 10 and 11, below. Table 10 represents the first square edge countertop sample and Table 11 represents the second square edge countertop sample.

TABLE 10

| Top | 32° F. | 100° F. | 0° F. | 120° F. |
| --- | --- | --- | --- | --- |
| simple butt joint | NE | NE | NE | blister in contact adhesive |
| Spline joint | NE | NE | NE | NE |

TABLE 10-continued

| Top | 32° F. | 100° F. | 0° F. | 120° F. |
|---|---|---|---|---|
| Contact adhesive no rigid adhesive | edges mismatched | edges mismatched | edges mismatched | edges mismatched |
| Morton adhesive no rigid adhesive | edges mismatched | edges mismatched | edges mismatched | edges mismatched |
| Postformed top | NE | NE | NE | hot glue failure at backsplash |

TABLE 11

| Top | -20° F. | 140° F. | -400° F. | High Humidity |
|---|---|---|---|---|
| Simple butt Joint | seam failure edge failure | total failure | | |
| Spline joint | NE | contact glue blistered | NE | NE |
| Contact adhesive no rigid adhesive | edges mismatched | edges mismatched | edges mismatched | slight edge mismatch |
| Morton adhesive no rigid adhesive | edges mismatched | edges mismatched | edges mismatched | edges mismatched |
| Postformed top | backsplash separation | contact glue blistered | edges mismatched | edges mismatched and separation |

The drastic difference in performance between the simple butt joint sample and the spline joint sample highlights the importance of proper fabrication. Teardowns after the experiments showed that the application of rigid adhesive around the perimeter of the simple butt joint sample was not as uniform as the spline joint sample. Rigid adhesive was found overlapping the contact adhesive (poor adhesion area), and in other areas very little rigid adhesive was found. When compared to the simple butt joint, the spline joint totally eliminated any seam separation. Warpage was evident on all samples. During the first cycle when temperatures were at 32° F., the ends curled up. In all other cycles, except for the last where the chamber was held at a high humidity for an extended period, the ends curled down. The time spent at high humidity (and high temperature) in the intermediate cycles was not enough to reintroduce moisture to the particleboard.

Edge mismatch (overlapping edges) on the contact adhesive sample was worse than on the Morton one part urethane adhesive sample. While the Morton adhesive did outperform contact adhesive, it alone was not be able to keep seams from separating on postformed tops.

The spline joint works to limit seam separation on square edge and postformed top seams. Properly applied rigid adhesive effectively limited both edge mismatch and seam separation. Poorly applied rigid adhesive may promote a "dead zone" found around square edge countertop perimeters. Postformed tops with butt joint seams may separate at the seam if temperature extremes are encountered.

It was also found that the Morton one part urethane adhesive was an environmentally friendly alternative to solvent based contact adhesive, but it alone did not solve expansion contraction issues in post formed tops.

EXAMPLE

This example was conducted to substantiate the earlier examples which demonstrate the benefits of employing the spline technique of the present invention. All testing was done on a full scale basis with tops being put in the Thermotron environmental chamber. The Thermotron is 8' deep by 6' tall on the inside. It is able to vary both temperature and humidity.

Samples

All samples utilized ¾" thick medium density particle board as a substrate and 0.090" thick Heavy VALOX® sheet as a top except where noted. All samples had Nuvel® edges put on with rigid seam kit adhesive as supplied by ITW (red label).

Environment

Testing showed that most of the cracks occur at the high humidity. This occurs because the substrate expands as it picks up moisture, and forces seams apart. Therefore, since time is of a premium in the Thermotron, the humidity soak was done at high humidity only. Also, since it is possible that cracks take days to form even at humidities as high as 85%, the humidity soak was done for a week. In the results below, a failed rating indicates the presence of any visible crack or delamination. In contrast, a passing rating indicates no visible cracks or delamination. Thermotron settings were as follows: 7 days at 85% humidity; 24 hours at -20° F.; 24 hours at 120° F.

| Samples | | | |
|---|---|---|---|
| Substrate | Seam | Perim. bond | Comments |
| Particle Board | No seam | None | Control |
| Particle Board | No seam | None | Melamine coating on back |
| Particle Board | No seam | None | Lacquer sealer on back |
| Med. Dens. Fiberboard | No seam | None | |
| Oriented Strand board | No seam | None | |
| Particle Board | w/perim. | Yes | 1" on each side of seam |
| Particle Board | w/spline | Yes | |
| Particle Board | w/spline | Yes | Postformed top |
| Particle Board | w/spline | Yes | Profile extrusion* |
| Particle Board | w/spline | Yes | Contact cement under* |

*at Formica

| Substrate | Seam | Perim. bond | Humidity effect | Temperature effect | Comment |
| --- | --- | --- | --- | --- | --- |
| Particle board | No seam | None | fail | fail | Control |
| Particle board | No seam | None | fail | fail | melamine didn't help keep humidity out |
| Particle board | No seam | None | fail | fail | lacquer sealer didn't keep humidity out |
| Med. Dens. Fiberboard | No seam | None | pass | fail | Fiberboard more stable with moisture |
| Oriented Strand board | No seam | None | fail | fail | worst failure. Big cracks |
| Particle Board | w/perim. | Yes | fail | pass | perimeter bond most effective with temp. |
| Particle Board | w/spline | Yes | pass | pass | |
| Particle Board | w/spline | Yes | pass | pass | Postform, small crack due to spline design |
| Particle Board | w/spline | Yes | pass | pass | profile extrusion* |
| Particle Board | w/spline | Yes | pass | pass | contact cement under spline* |

*at formica

Conclusions

Perimeter bonding around the seam worked best when the top surface moved substantially, e.g., Nuvel®. Humidity had large effects on differential expansion and contraction when the substrate was a wood based product. Melamine coating and sealers did little to keep the humidity out of the particle board and was completely ineffective in controlling expansion/contraction in a temperature cycle. These examples confirmed, however, that splines under the seam made a strong joint which minimized seam failure due to differential expansion/contraction.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including the equivalents thereof.

What is claimed is:

1. A composite article of manufacture, comprising:

(A) a cellulose based substrate material having a groove therein;

(B) a thermoplastic coating material comprising a polyester resin selected from the group consisting of polyethylene terephthalate, polypropylene terephthalate, polybutylene terephthalate, and polycyclohexyldimethylene terephthalate, said coating material having expansion properties significantly different that said substrate material, wherein the difference in expansion properties between said substrate and said coating is at least 500%, said coating material having joint forming a seam;

(C) a composite adhesive comprising a rigid adhesive and a laminating adhesive which bonds said coating to said substrate material; (D) a spline being bound in said groove by said laminating adhesive, said spline being bound to said coating material along said seam by said rigid adhesive; wherein said spline material has expansion properties similar to the coating material.

2. The composite article of manufacture according to claim 1, wherein said thermoplastic material further comprises an inorganic filler.

3. The composite article of manufacture according to claim 2, wherein said inorganic filler is selected from the group consisting of zinc oxide, barium sulfate, zirconium oxide, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins, glass microspheres, wollastonite, titanium dioxide, and ground quartz.

4. The composite article of manufacture according to claim 3, wherein said filler comprises zinc oxide, barium sulfate, zirconium oxide, zirconium silicate, strontium sulfate, titanium dioxide, glass microspheres or mixtures thereof.

5. The composite article of manufacture according to claim 1, wherein said thermoplastic material comprises at least one polyester and at least one polycarbonate.

6. The composite article of manufacture according to claim 1, wherein said cellulose based material is particleboard, fiberboard, or plywood.

7. The composite article of manufacture according to claim 6, wherein said suitable laminating adhesive has an adhesive strength sufficient to cause substrate failure when separated from said coating material.

8. The composite article of manufacture according to claim 1, wherein said suitable rigid adhesive is a solid surfacing adhesive material.

9. The composite article of manufacture according to claim 8, wherein said solid surfacing adhesive is selected from the group consisting of acrylic adhesive, epoxy based adhesive, vinyl acetate adhesive, urethane adhesive and cyanoacrylate adhesive.

10. The composite article of manufacture according to claim 1, wherein said suitable laminating adhesive comprises a solvent based laminating adhesive.

11. The composite article of manufacture according to claim 1, wherein the difference in expansion properties between said substrate material and said coating material is on the order of 750%.

12. The composite article of manufacture according to claim 1, wherein the article of manufacture is selected from counters, integrated sinks, desks, shower surrounds and other bathroom accessories, furniture, doors, appliance fascias, cabinets, work surfaces, profile edging, tile walls or chemical resistant lab tops.

13. The composite article of manufacture according to claim 12, wherein said article of manufacture is a counter, integrated sink or shower surround.

* * * * *